United States Patent
Born et al.

(10) Patent No.: US 6,247,040 B1
(45) Date of Patent: *Jun. 12, 2001

(54) METHOD AND STRUCTURE FOR AUTOMATED SWITCHING BETWEEN MULTIPLE CONTEXTS IN A STORAGE SUBSYSTEM TARGET DEVICE

(75) Inventors: Richard M. Born; Jackson L. Ellis; David R. Noeldner, all of Fort Collins, CO (US)

(73) Assignee: LSI Logic Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/720,393

(22) Filed: Sep. 30, 1996

(51) Int. Cl.$^7$ .................................................... G06F 9/00
(52) U.S. Cl. .................. 709/103; 709/100; 709/102; 709/107; 709/108; 711/100; 710/264
(58) Field of Search ...................... 395/650, 181, 395/894, 678; 364/200; 709/100, 108, 102, 103, 107; 711/100; 710/264

(56) References Cited

U.S. PATENT DOCUMENTS

| | | | |
|---|---|---|---|
| 4,658,351 | 4/1987 | Teng | 364/200 |
| 4,688,166 | 8/1987 | Schneider | 364/200 |
| 4,843,544 | 6/1989 | DuLac et al. | 364/200 |

(List continued on next page.)

OTHER PUBLICATIONS

IBM Technical Disclosure Bulletin; vol. 32, No. 3B, Aug., 1989; Common Microcode Finite State Machine for Driving both an Enhanced Small Disk Interface and an ANSI 3.8 Interface; pp. 96–105.

*Primary Examiner*—Valencia Martin-Wallace
*Assistant Examiner*—Yveste Gilberte Cherubin

(57) ABSTRACT

In a storage target device controller capable of managing multiple command contexts, methods and associated apparatus are provided for automatically managing the plurality of contexts using a state machine model. The state machine model is operable on a target device controller having an active context register set for processing of the presently active transfer on the host channel and an inactive context register set for storing an inactive context. The active context register set and inactive context register set are rapidly and automatically swapped by operation of the state machine model to resume or start processing of an inactive context. Additional inactive contexts are stored in a buffer memory associated with the target device controller. The inactive context register set is automatically stored into a selected one of the additional inactive contexts or loaded from a selected one of the additional inactive contexts by operation of the state machine model of the present invention. The state machine model performs appropriate swap, load, and store operations for contexts in accordance with priorities to improve performance of the target device. The highest priority is an auto-write context corresponding to a write command for which data will be imminently received on the host channel. The next priority is the disk context so as to provide sufficient host channel activity to maintain continuous disk channel operation. The last priority is any other context corresponding to any other command which is neither an auto-write context or the present disk context.

22 Claims, 5 Drawing Sheets

U.S. PATENT DOCUMENTS

| | | | | |
|---|---|---|---|---|
| 5,057,997 | * | 10/1991 | Chang et al. | 364/200 |
| 5,127,098 | * | 6/1992 | Rosenthal et al. | 395/650 |
| 5,136,692 | | 8/1992 | Barrett et al. | 395/250 |
| 5,142,677 | | 8/1992 | Ehlig et al. | 395/650 |
| 5,175,825 | | 12/1992 | Starr | 395/325 |
| 5,280,603 | | 1/1994 | Jeppson et al. | 395/425 |
| 5,287,471 | | 2/1994 | Katayose et al. | 395/425 |
| 5,289,583 | | 2/1994 | Fischer et al. | 395/325 |
| 5,293,597 | | 3/1994 | Jensen et al. | 395/400 |
| 5,317,715 | | 5/1994 | Johnson et al. | 395/425 |
| 5,319,789 | | 6/1994 | Ehlig et al. | 395/800 |
| 5,367,680 | | 11/1994 | Flurry et al. | 395/650 |
| 5,371,849 | | 12/1994 | Peaslee et al. | 395/162 |
| 5,371,861 | | 12/1994 | Keener et al. | 395/325 |
| 5,421,014 | | 5/1995 | Bucher | 395/650 |
| 5,426,737 | | 6/1995 | Jacobs | 395/275 |
| 5,428,163 | | 6/1995 | Lawler | 395/500 |
| 5,428,779 | | 6/1995 | Allegrucchi et al. | 395/650 |
| 5,430,841 | | 7/1995 | Tannenbaum et al. | 395/164 |
| 5,444,853 | | 8/1995 | Lentz | 395/250 |
| 5,469,553 | | 11/1995 | Patrick | 395/750 |
| 5,471,639 | | 11/1995 | Harrington | 395/842 |
| 5,497,490 | | 3/1996 | Harada et al. | 395/700 |
| 5,513,368 | | 4/1996 | Garcia, Jr. | 395/842 |
| 5,513,374 | | 4/1996 | Baji | 395/846 |
| 5,524,268 | | 6/1996 | Geldman et al. | 395/825 |
| 5,537,566 | | 7/1996 | Konno et al. | 395/441 |
| 5,634,081 | | 5/1997 | Krakirian | 395/894 |
| 5,649,230 | | 7/1997 | Lentz | 395/872 |
| 5,659,750 | | 8/1997 | Priem et al. | 395/678 |
| 5,678,024 | | 10/1997 | Wagar et al. | 395/456 |
| 5,694,333 | | 12/1997 | Andrade et al. | 364/514 |
| 5,708,808 | * | 1/1998 | Shoichi | 395/678 |
| 5,727,211 | | 3/1998 | Gulsen | 395/678 |
| 5,740,466 | | 4/1998 | Geldman et al. | 395/825 |
| 5,742,822 | | 4/1998 | Motomura | 395/672 |
| 5,752,083 | * | 5/1998 | Krakirian | 395/894 |
| 5,754,818 | * | 5/1998 | Mohamed | 395/417 |
| 5,758,051 | * | 5/1998 | Moreno et al. | 395/181 |

* cited by examiner

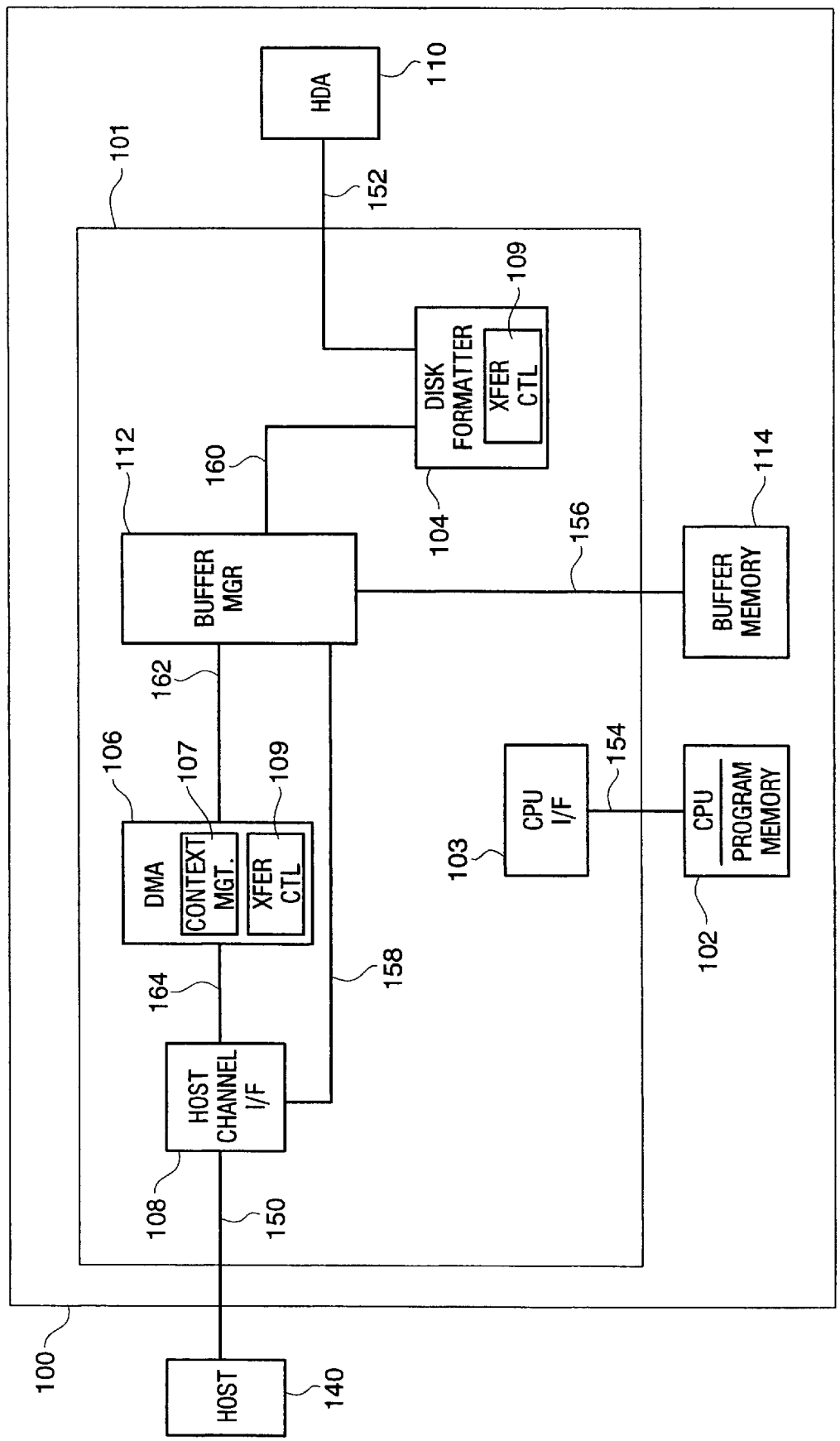
FIG._1

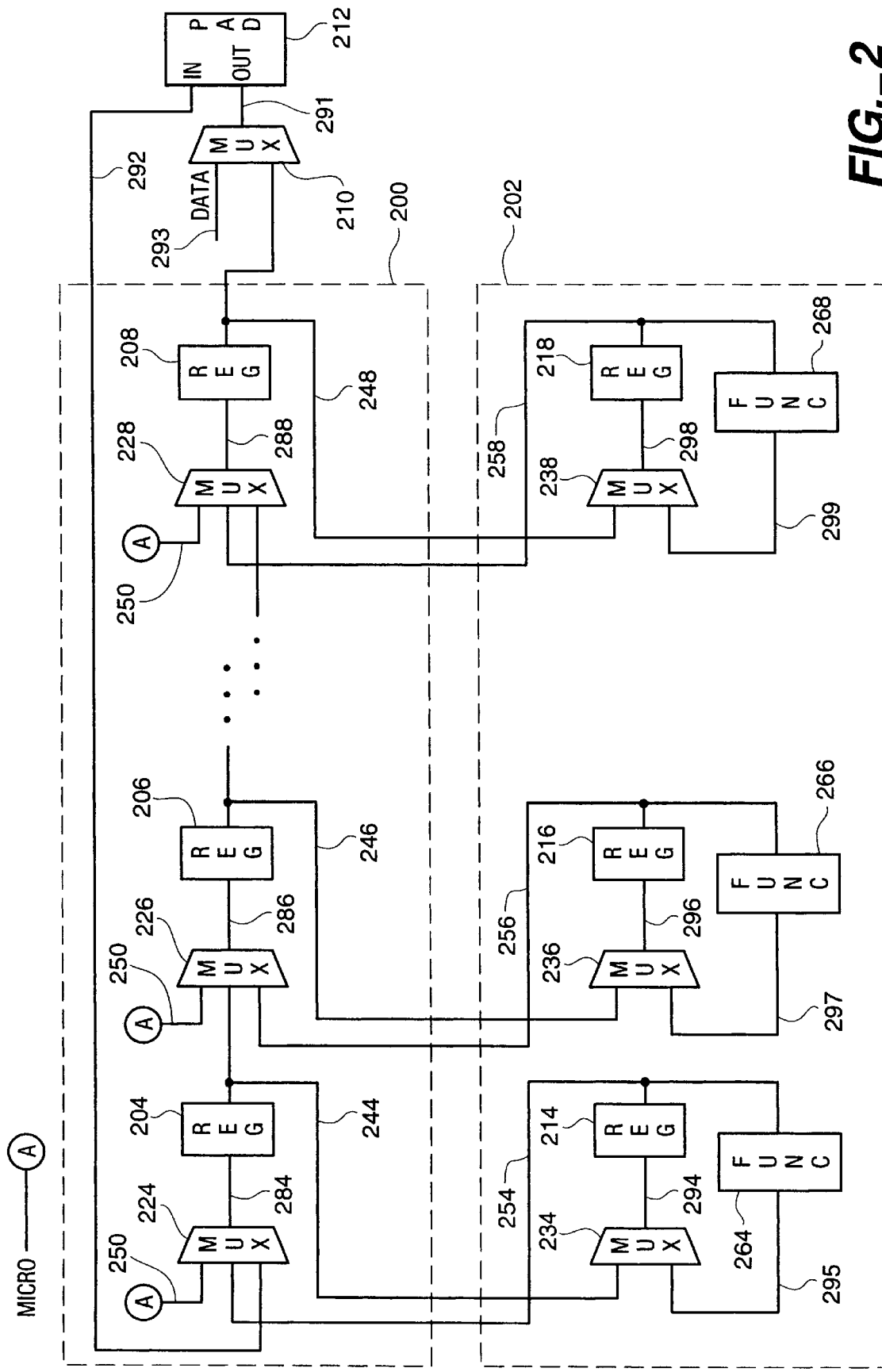
FIG._2

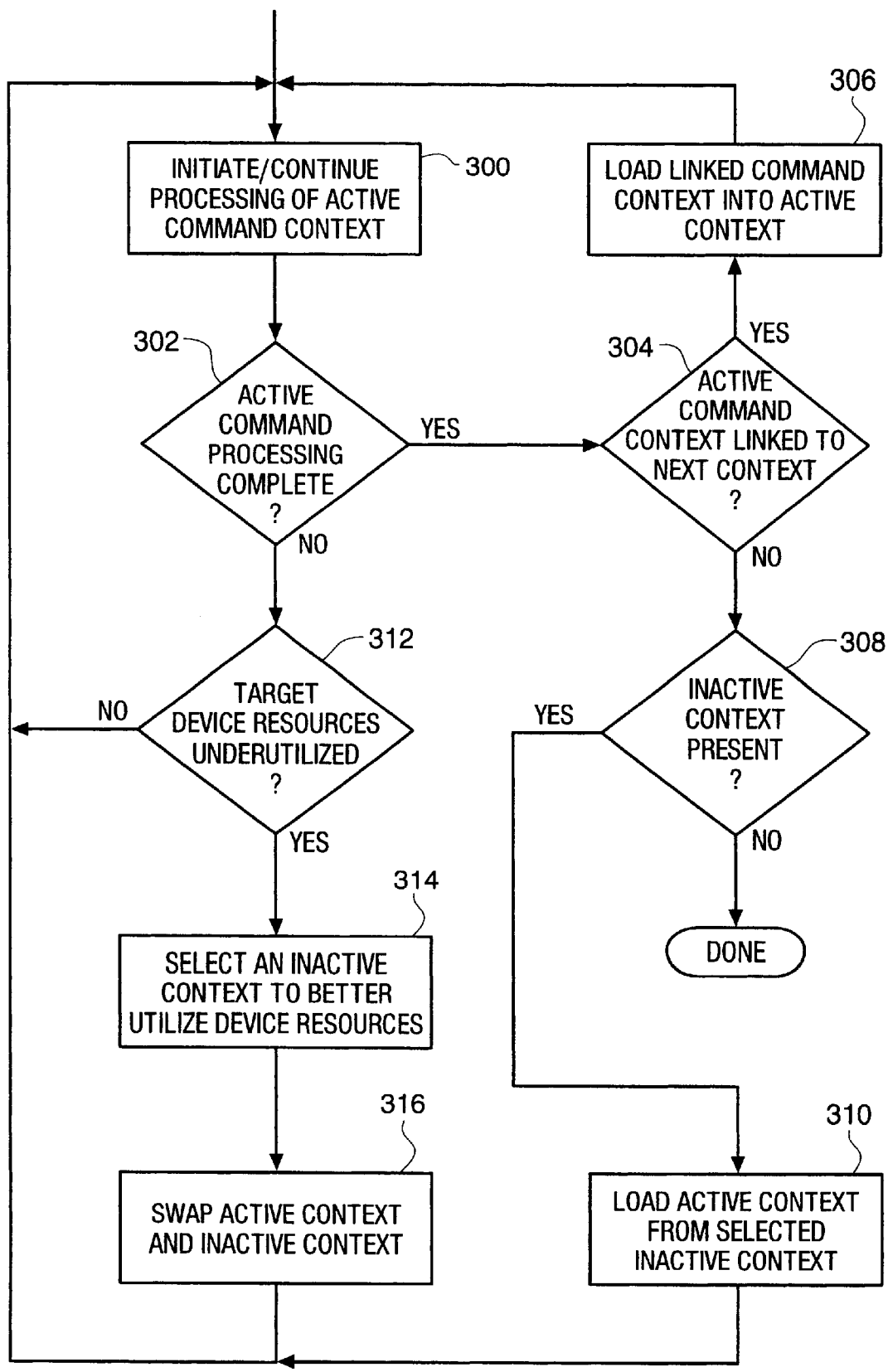
FIG._3

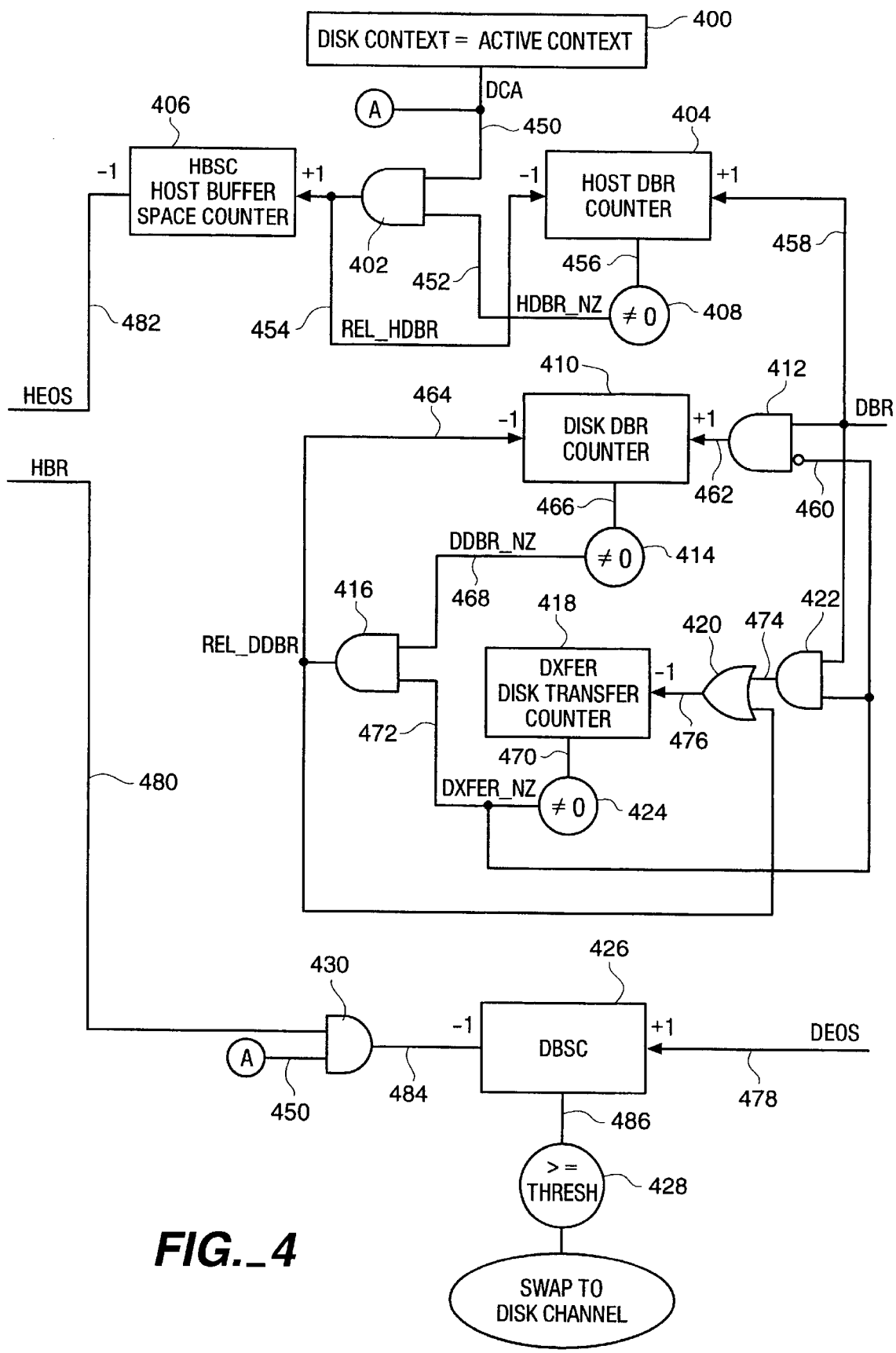
FIG._4

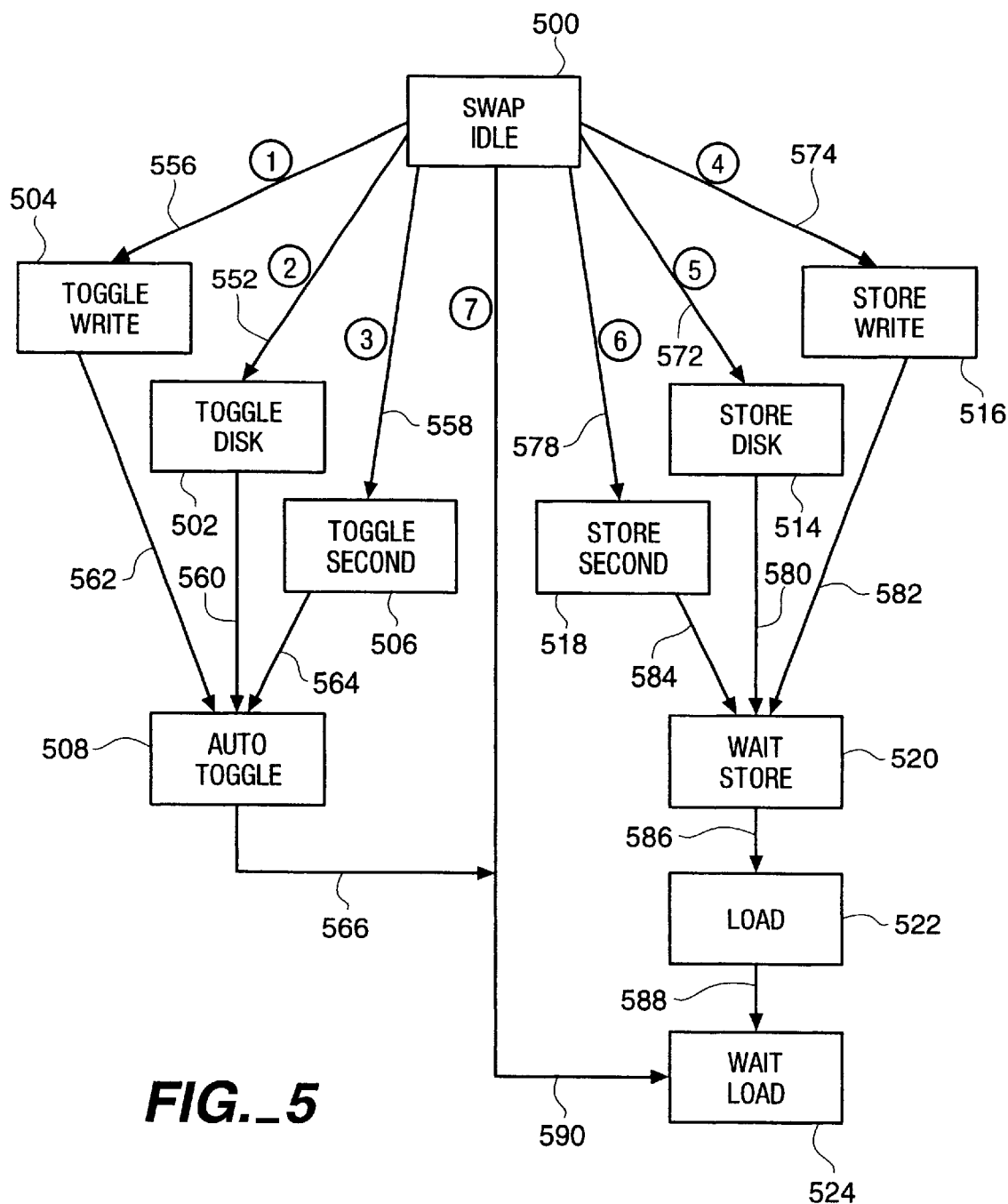
FIG._5

METHOD AND STRUCTURE FOR AUTOMATED SWITCHING BETWEEN MULTIPLE CONTEXTS IN A STORAGE SUBSYSTEM TARGET DEVICE

BACKGROUND OF THE INVENTION

1. Field of the Invention

The present invention relates to storage subsystem target devices and, more specifically, relates to methods and associated structure for automatically switching and selecting from among a plurality of contexts within a target device having the ability to process multiple command contexts.

2. Discussion of Related Art

A storage subsystem includes one or more storage devices for the persistent storage of information. The information and structure relating to the information storage is typically provided to the storage devices by a host computer system (or other storage management device) through an I/O adapter. As used herein, initiator device refers to the host computer system and/or its associated I/O adapter. The target device, as used herein, refers to a selected one of the storage devices to which the initiator device directs an I/O request. The bus over which the initiator and target device communicate is referred to herein as the host channel.

The initiator/target device terminology is common to a standard bus known as Small Computer System Interface (hereinafter SCSI)—a popular electronic bus used to interconnect computers and peripheral devices. However, the problems known in the prior art discussed herein below and the solutions provided thereto by the present invention are common to any of several well known host channel media and architectures, including but not limited to: Fibre Channel, SSA, IPI, IDE, EIDE, and others. For simplicity, the problems and solutions thereto addressed by the present invention are presented herein in the context of a SCSI host channel connection. However, one of ordinary skill in the art will readily recognize that the problems and solutions addressed herein are applicable to other host channel environments.

The SCSI bus has become a common choice for connecting computing devices (through a SCSI adapter in the computer system) to storage peripheral devices such as disk drives, tape drives, disk arrays, and other storage and peripheral I/O devices. The specifications for the SCSI standards for the bus and the information exchanged thereon are publicly available in several forms including the ANSI publication SCSI 2 Standards Document X3T9.2/375R revision 10 L. Under the SCSI specifications, each device attached to the SCSI bus has a unique ID value by which it is identified on the SCSI bus. An initiator device initiates an I/O request to an identified target device and transfers any required data by asserting control over the SCSI bus (if available) and directing one or more commands to the identified target device. In general, the target device performs the requested operation and returns information. The returned information may comprise simple sense or status information, or may comprise, for example, data retrieved from a mass storage peripheral device.

A disk drive stores and retrieves data via control circuits and methods (an embedded controller) which command the head disk assembly (HDA) to perform the required physical storage and retrieval of information on the magnetic or optical medium. The interface within the controller to the HDA is referred to herein as the disk channel or formatter. Typically the data transfer bandwidth across the host channel is significantly greater than the bandwidth on the disk channel.

A significant portion of the bandwidth of the host channel may be idle while the disk drive (or other SCSI peripheral device) attempts to process the I/O request via interaction with the actuator through the slower disk channel. Standard SCSI disconnect and reconnect protocols will permit other devices to utilize the SCSI bus during this period. If no other initiator/target connection is established, the host channel will remain idle while the disconnected target device processes the request. Rather, the initiator simply awaits completion of the initiated command (when the target re-selects the initiator) before further interacting with that same target device.

Though the target device is incapable of responding to the first initiated command sequence, typical target devices also fail to respond to other commands which could be processed without requiring use of the busy disk channel. Target devices, in accordance with the SCSI standards, are often therefore referred to as single-threaded in the sense that they enforce a restriction that only a single command (a single thread) can be processed at a given time. This single-threaded architecture may therefore tend to underutilize the high speed host channel and thereby extend the latency of other queued commands.

A solution proposed in co-pending, patent application Ser. No. 96-064,068 provides for the processing of multiple commands within a target device in order to improve utilization of resources within the target device. In particular, multiple host commands may be processed each in a unique context containing all parameters relevant to the processing of that command. One command, the active context, is processed at a time. However, when processing of the active context underutilizes the resources of the target device, another command, one or a plurality of inactive contexts, is swapped with the active context to better utilize resources of the target device.

However, selecting an inactive context from among a plurality of such contexts and switching (or swapping) the active context with the selected inactive context must occur rapidly. Intervention by a general purpose processor programmed to perform such selection and swapping of contexts may be too slow to achieve the desired performance goals. For example, swapping the presently active context with a new context for a write command for which the host channel will imminently receive data may require very rapid response to avoid loss of the received data from the host channel. Or, for example, when the disk channel is operating independent of the host channel context which initiated its operation and the disk channel requires additional interaction with the host channel to exchange additional data blocks, the response must be rapid enough to avoid stopping the disk channel for lack of host channel interaction.

SUMMARY OF THE INVENTION

The present invention solves the above and other problems, thereby advancing the state of the useful arts, by providing methods and associated structure to automatically and rapidly select a next context to be processed from among a plurality of contexts and to swap the selected context with the presently active context.

The present invention includes features in the target device controller to store an active context and an inactive context in register sets on the controller. The active and inactive context register sets may be rapidly swapped by other features of the present invention do thereby activate a previously inactive context. Other inactive contexts are stored in segments of a buffer memory associated with the target device controller. These other inactive contexts may be loaded into the inactive context register and the inactive context register set may be stored into the buffer memory for later retrieval and loading. Through appropriate load, store, and swap operations, the state machine model of the present invention automates the management of a plurality of contexts.

The present invention provides for a state machine model to manage a plurality of inactive contexts and to select from among them in accordance with a priority value assigned to each. The state machine model of the present invention is specifically operable to manage three inactive contexts which may be loaded from or stored to the buffer memory of the controller through the inactive context register set. An auto-write context is loaded into the inactive context and swapped into the active context in response to receipt of a write command from the host channel for immediate receipt of the write data by the target device from the host channel. The auto-write context has the highest priority in order to prepare for receipt of host channel data. The disk context, as used herein, refers to whatever previously active context initiated present operation of the disk channel. The disk context is loaded into the inactive context and swapped into the active context when the disk channel indicates that it requires additional data blocks be exchanged over the host channel to avoid stopping the disk channel processing. The disk context is the second highest priority so as to avoid stopping the processing of the disk channel. The secondary context, as used herein, refers to any other command context which is presently inactive in the target device controller. For example, when other contexts presently occupy the active and inactive context register sets (i.e., the auto-write and disk contexts), another command context presently in process is stored in the secondary context. The secondary context is the lowest priority and is loaded into the inactive context and swapped into the active context when the present active and inactive contexts are both idle and therefore underutilizing resources of the target device.

The present invention provides these features as a simple state machine model to permit implementation in electronic circuits. Such a hardware state machine model implementation assures rapid, automated response to the changes in context status and processing.

It is therefore an object of the present invention to provide methods and associated apparatus for automatically managing multiple contexts in a storage target device using a state machine model.

It is a further object of the present invention to provide methods and associated apparatus for automatically managing an active context and a plurality of inactive contexts in a storage target device using a state machine model.

It is still a further object of the present invention to provide methods and associated apparatus for automatically managing swapping between an active context and a selected one of a plurality of inactive contexts in a storage target device using a state machine model.

It is yet another object of the present invention to provide methods and associated apparatus for automatically loading a selected one of a plurality of inactive contexts into an inactive context register set for swapping into an active context register set in a storage target device using a state machine model.

It is yet a further object of the present invention to provide methods and associated apparatus for automatically storing an inactive context register set into a selected one of a plurality of inactive contexts in a storage target device using a state machine model.

BRIEF DESCRIPTION OF THE DRAWINGS

FIG. 1 is a block diagram of a storage target device (disk) controller embodying the methods and structures of the present invention;

FIG. 2 is a block diagram of register sets for implementing the multiple context management features of the present invention;

FIG. 3 is a flowchart describing the operation of the methods of the present invention to switch between multiple contexts to better utilize resources in the target device;

FIG. 4 is a block diagram of circuits of the present invention which provide for rapid switching between a host channel activity and a disk channel activity in management of multiple contexts; and FIG. 5 is a state diagram of the methods of the present invention which manage multiple contexts in accordance with the present invention.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Target Device Controller

FIG. 1 is a block diagram of a typical control component for a storage target device 100 (such as a disk drive) as presently known in the art. The target device 100 includes a controller 101 which provides control processing functions for communications with an attached host 140 via bus 150 and host channel interface 108. The disk formatter 104 within controller 101 performs real time control functions for the head disk assemblies 110 (HDA) via bus 152. As is known in the art, bus 150 may be any of several standard bus structure for attachment of a target storage device 100 including: SCSI, Fibre Channel, IDE, EIDE, IPI, PCI, SSA, etc. Bus 152 is representative of a bus structure which includes digital and servo control signals for operation of the actuators and motors as well as analog signals for the transfer of information between the controller 101 and the HDA 110 storage medium (such as rotating magnetic or optical disks).

As shown in FIG. 1, target device 100 includes CPU 102 which controls the overall operation of controller 101 through CPU interface 103 via bus 154. One of ordinary skill in the art will readily recognize that an interconnection bus (not shown) permits CPU 102 to exchange signals with the other components of controller 101. In addition, CPU 102 may be integrated with other components of the controller 101. Such design choices and considerations which determine the level of integration desired for a particular application are well known in the art. Buffer memory 114 in target device 100 is connected to buffer manager 112 in the controller 101 via bus 156. Buffer memory 114 is used to temporarily buffer, store, and retrieve information exchanged indirectly between an attached host 140 and the storage medium in HDA 110. The buffer memory 114 may also be integrated within components of the controller 101 as a normal matter of engineering design choice. Further, as shown in FIG. 1, CPU 102 often includes program memory for storage of instructions and variables for overall control of the controller 101.

The host channel bus 150 and host channel interface 108, in combination or alone, are referred to herein as a host channel. The disk formatter 104, bus 152, and HDA 110, in combination or alone, are referred to herein as the disk channel.

CPU 102 controls the overall operation of target device 100 in that it (in conjunction with host channel interface 108) receives requests from an attached host via the host channel, interprets the requests, and initiates appropriate processing within the target device 100 to satisfy the request (i.e., to read or write information on HDA 110). The disk channel, through disk formatter 104, performs processing specific to the digital, analog, and servo controls required to manage HDA 110 via bus 152.

DMA 106 provides direct memory access between host channel interface 108 and buffer memory 114 via busses 156, 162, and 164 and buffer manager 112. The high bandwidth capability of the host channel requires rapid access to the buffer memory 114 without the need for intervention by CPU 102. When such high speed data exchange is not required for processing of a particular command, host channel interface 108 may exchange information with buffer memory 114 via busses 158 and 156 and buffer manager 112 to thereby bypass use of DMA 106. Disk formatter 104 exchanges data with buffer memory 114 via busses 156 and 160 and buffer manager 112.

Context management 107, in conjunction with CPU 102, the host channel, and the disk channel, performs the specific processing of the methods of the present invention to manage multiple command contexts. In particular, an active command context and one or more inactive command contexts are stored in structures within context management 107. As discussed in detail below, the context structures within context management 107 for storing contexts may be register sets or other memory components. Further, as noted below, additional command contexts may be stored in buffer memory 114 to extend the number of inactive command contexts which may be managed by the methods of the present invention.

Logic within context management 107 determines when an inactive context must be loaded from buffer memory 114 into context management 107 or stored from context management 107 into buffer memory 114. In addition, context management 107 in conjunction with transfer control logic 109 (shown as contained within DMA 106 and disk formatter 104) determines when the active context and an inactive context within context management 107 should be swapped (toggled) in order to best utilize resources in the target device or to improve utilization of the host channel bandwidth.

One of ordinary skill in the art will readily recognize that FIG. 1 is intended only as a conceptual block diagram of a target device controller in which the methods and structure of the present invention may be advantageously applied. Many equivalent variants of the design shown in FIG. 1 may be apparent to those skilled in the art. In particular, the subcomponents of controller 101 may be logically subdivided in several functionally equivalent manners. In particular, one of ordinary skill may determine that particular functions may be implemented flexibly in programmed instructions within CPU 102 or may determine that the speed of custom integrated circuitry is required for management of multiple contexts. The methods of the present invention are therefore presented below as operable generally within the target device 100 of FIG. 1. The methods may be implemented as programmed instructions within CPU 102, or, as shown, as custom circuits and logic within the controller 101 (e.g., context control 107 and transfer control 109). The block diagram of FIG. 1 is therefore intended only to suggest one possible arrangement of components in a target device 100 in which the methods and structures of the present invention may be embodied.

Command Contexts

As used herein, context or command context refers to all information required to process a single command within the controller of the target device. Elements of such a context may include address and length values which are incremented or decremented as a requested data transfer proceeds as well as flags which define particular options of the transfer. Such address pointers and counters refer to the host channel transfer of information to or from the disk channel and or buffer memory. As used herein, the active context is the command context of the command presently being processed within the controller 101 of FIG. 1 on behalf of a command from an attached host device (i.e., the command presently transferring data over the host channel). The methods and structures of the present invention add the capability to manage one or more additional contexts within the target device. The additional contexts are also referred to herein as inactive contexts or inactive command contexts.

Structures of the present invention store multiple command contexts for use in processing multiple commands. One active context and one or more inactive contexts are stored within the controller of the present invention. Methods of the present invention manage the stored contexts to concurrently process multiple commands in the target device. Various conditions are monitored by the methods of the present invention to determine whether and when the active context should be replaced by one of the inactive contexts. Such a swap (also referred to herein as a toggle) of active and inactive contexts make the active context now inactive and starts processing relating to a previously inactive command context (thereby making it the active context). The context information is rapidly and automatically switched by the structures and apparatus of the present invention to achieve the context switch with minimal delays imposed therebetween.

The controller of the target device therefore initially processes received commands in the host channel interface. If the interface determines that the command can be processed immediately, a predefined context within the context management will be selected, loaded if necessary from the buffer memory, and swapped into the active context. The microprocessor of the controller generates contexts in anticipation of future commands received via the host channel interface 108. In this manner, the microprocessor will not be the cause of a performance problem in most common command processing circumstances, but rather performs background context management processing.

Multiple Context Management Methods

In general the methods of the present invention switch or swap contexts in order to improve particular performance attributes of the particular target device. For example, it may be desirable to maximize the use of the host channel bandwidth to move data to or from an attached host or minimize the latency in processing multiple commands from a host directed to one target device. Or for example it may be desirable to assure minimum rotational latency in a disk storage target device so as to process back-to-back (coalesced) commands within the target device. These and other performance goals may be combined in making determinations as to which command context should be processed as the active context to maximize the desired performance goals.

One of ordinary skill in the art will readily recognize that the particular performance goals are unique to the particular target device environment and application. The desired goals may vary according to the characteristics of the host channel, the disk channel, the buffer memory, and the HDA assemblies. The methods of the present invention define a structure and methods in which any such performance goals may be measured and maximized through context switching between multiple commands contexts.

FIG. 3 is a flowchart describing at a high level the methods of the present invention to manage multiple contexts within the target device. Detailed operation of the methods of the present invention is dependent upon the precise application environment and the performance goals to be improved. The processing of FIG. 3 is operable, as noted above, within controller 101 of FIG. 1 and more particularly within the combination of CPU 102, DMA 106, disk formatter 104, and buffer manager 112 of controller 101. A specific state machine model for managing the switching of multiple contexts is presented in additional detail below with respect to FIG. 5. The flowchart of FIG. 3 therefore presents the overall flow of control of the methods of the present invention.

Element 300 of FIG. 3 is first operable to initiate or continue processing the presently active command context. Element 302 is operable in response to a change of state within the controller 101 of FIG. 1 to detect that processing of the active context is completed or paused. Changes of state that may initiate processing of element 302 include, for example, completion of the currently active command context, receipt of another command context from a host changes in the status of the disk channel, etc.

If element 302 determines that the present active context processing is complete, element 304 is next operable to determine if another presently inactive context is linked to the active (now completed) context. If such an inactive context is linked to the presently active context (just completed), that context is loaded into the active context by element 306. Element 300 is then operable to initiate processing on the newly active context. The inactive context from which the active context is copied is then free to store another command context received from a host unless there remains status to be exchanged with the local microprocessor. In such a case the active context may remain swapped in the inactive context until the local microprocessor clears the inactive context. Linking of contexts is noted below in additional detail as one advantageous application of the methods and structures of the present invention.

If element 304 finds no linked context associated with the completed active context, then element 308 is next operable to determine if there are any inactive contexts presently storing commands in some stage of process (as distinguished from an empty, unused command context). If there are no inactive commands which may be actively processed, processing of the method of FIG. 3 is completed until another command is received from an attached host. Otherwise, element 310 is operable to load the active context with the selected inactive context. If more than one inactive contexts are stored in accordance with the present invention, element 310 is operable to select a preferred one of the inactive contexts to be loaded into the active context. This selection is in accordance with the needs and performance goals of a particular target device environment and application. In certain applications, the order of selection of an inactive context to become the next active context may be important. In others, the order of selection may be of no significance. One of ordinary skill in the art will readily recognize many possible selection criteria among a plurality of inactive contexts as performed in element 310. Processing then continues by looping back to element 300 to initiate processing of the newly activated context. The inactive context from which the active context was loaded is then free for re-use by another command received from the host, unless, as noted above, status information must be exchanged with the local microprocessor.

If element 302 determines that the presently active context is still in process, then element 312 is operable to determine if the target device resources are underutilized with respect to the particular performance goals of the application of the present invention. If the target device resources are underutilized, element 314 is operable to select one of the inactive command contexts which will improve the resource utilization.

As noted above with respect to element 310, the criteria used to determine the desired performance goals are unique to a particular target device application. For example, in many environments, increased utilization of the available host channel bandwidth is a desired goal as is reducing the latency in processing of host commands by accepting and processing additional command contexts. Likewise, reduction in delays in command processing within the target device due to rotational latency delays inherent in rotating disk drives is a desirable goal (i.e., maintaining maximum utilization of the disk channel of the target device). The selection of an inactive context to be activated may therefore seek to improve these or other performance goals. Selection of an inactive context which is ready to transfer information over the host channel will improve host channel utilization. For example, a command which will not require disk channel information exchange may operate to transfer information over the host channel regardless of the status of the disk channel. SCSI commands such as SENSE and INQUIRY are exemplary of such commands which may transfer data over the host channel regardless of the state of the disk channel. An inactive command context which specifies a disk address near the present disk location as determined by the disk channel processor may be selected to reduce rotational latency delays. One of ordinary skill will readily recognize many equivalent performance goals which may be improved by appropriate evaluation and selection by processing of elements 310 and 314.

Element 316 is then operable to swap the presently active command context with the selected inactive command context. The active context thereby becomes inactive while the selected inactive context becomes active. The apparatus of the present invention, discussed in additional detail below, automatically performs the swap very quickly to maximize the potential performance benefits of activating the next command. Processing then continues with element 300 to continue or initiate processing of the newly activated command context.

The methods of the present invention thereby continuously evaluate the performance of the target device with respect to predetermined performance criteria. The methods of the present invention then select a preferred one of a plurality of commands to process to thereby improve the target device's performance.

Context Storage Preferred Embodiment

FIG. 2 is a block diagram of circuits of the present invention which implement the context swap structure of the present invention in the best presently known manner. The system depicted in FIG. 2 stores two contexts, each in a set of registers within context management 107 of FIG. 1. The active context 202 comprises a set of registers 214, 216, and 218 (also referred to herein as the active register set) which store the present values of parameters used in processing the presently active command (also referred to herein as active parameters). The host channel interface and microprocessor of the controller may each manipulate the register values as required to initiate the presently active command. MUX's 234, 236, and 238 are associated with the registers 214, 236, and 238, respectively. Each MUX provides its output to its associated register via signal path 294, 296, and 298, respectively.

As the active command is processed, each register value is modified as required by the processing of the command. For example, address register values and counter register values are incremented and/or decremented as each datum is transferred from a source location to a destination location within the target device. The present value output of each register 214, 216, and 218 is applied via paths 254, 256, and 258, respectively, to a functional block 264, 266, and 268, respectively. The functional blocks adjust the register value as required for each datum transferred in processing of the command (i.e., incrementing or decrementing the values as required). One of ordinary skill will recognize that some values in a command context may require no adjustment with the transfer of each datum while other values may require more complex functions than simple increment or decrement operations. Such no-op or more complex functions are also represented by the function blocks 264-268.

The modified (or unmodified) output value of the functional blocks 264, 266, and 268 are applied to MUX's 234, 236, and 238, respectively, via paths 295, 297, and 299, respectively. The MUX's are controlled as required by other circuits (not shown) of the controller to apply the modified value input to the associated register.

The number of registers required (along with associated MUX and functional blocks) is determined in accordance with the number of parameters required to store a command context. Additionally, the width of the registers is determined by the register values required in the particular target device environment. In the best presently known mode of implementing the present invention, all registers are of equal width and the number of such registers is sufficient to store the following context data structures:

```
| Byte 3    | Byte 2    | Byte 1   | Byte 1   |
|                       HSBA                   |
|                       HSCA                   |
|                       HAP                    |
|           HXFER       |         HBSC         |
| Mode      | Config    |         SSC          |
|                       LSC                    |
| Tag       | Status    |         unused       |
|                    ErrorCheck                |
``` where:
HSBA -      is the host segment base address (32 bits),
HSCA -      is the host segment ceiling address (32 bits),
HAP -       is the host address pointer (32 bits),
HXFER -     is the host block transfer count (16 bits),
HBSC -      is the host buffer space counter (16 bits),
MODE, CONFIG, TAG, and STATUS - are flags for the DMA operation (8 bits each),
SSC -       is the sector (block) size counter (16 bits),
LSC -       is the logical sector counter (32 bits), and
ErrorCheck - is a check code to verify the success of reloading a context from memory (32 bits such as a checksum or cyclic redundancy code).

One of ordinary skill will readily recognize that many equivalent data structures may be employed to represent the command context of a particular data transfer command. The particular address pointers and counters employed in the data structure above are therefore intended as exemplary of one mode of implementing a data structure for storage of a command context.

An inactive context 200 comprises a number of registers 204, 206, and 208 equal in number to that of the active context 202. Each inactive context register 204, 206, and 208 is of equal width and corresponds one-to-one with a register of the active context, namely registers 214, 216, and 218, respectively. The inactive register set 204, 206, and 208 are used to store parameters relevant to the processing of one inactive command (also referred to herein as inactive parameters). Each inactive register 204, 206, and 208 is associated with a MUX 224, 226, and 228, respectively, which determines the input value to be applied to the register via paths 284, 286, and 288, respectively.

The output of each inactive register 204, 206, and 208 is applied to an input of the MUX 234, 236, and 238, respectively, associated with its corresponding active register 214, 216, and 218, respectively, via paths 244, 246, and 248, respectively. Likewise the output value of each active register 214, 216, and 218 is applied to an input of the MUX 224, 226, and 228, respectively, associated with its corresponding inactive register 204, 206, and 208, respectively. In conjunction with the known settling times of such register and MUX's, this structure permits the values of the active and inactive register sets to be rapidly swapped by appropriate selection of the MUX's 224, 234, 226, 236, 228, and 238.

As noted above, processing components in the controller can directly load and manipulate the values in the registers 204, 214, 206, 216, 208, and 218 via appropriate paths not shown. An exemplary path for such access to load values into the inactive registers is depicted as path 250 which applies a microprocessor supplied value to the input of the MUX's associated with the inactive registers. The more common access to the registers is via complete loading of the entire inactive register set with all values associated with an inactive command context.

Since the entire inactive register set is typically loaded with a command context structure, an efficient path for such loading is provided. The entire inactive context (comprising another set of inactive parameters) is structured as a shift register wherein each register is chained to the next such that the full width output value of one register is shifted to the input of the next register. The last register essentially shifts its value back to the first register to complete the shift chain. Specifically, the output value of inactive register 204 and 206 is applied via paths 244 and 246, respectively, to the MUX 226, and 228, respectively, of the next inactive register 206 and 208, respectively in the inactive register chain. The last inactive register 208 applies its output to an input of MUX 210, via path 248, which in turn applies its output to PAD 212. PAD 212 also applies a value to path 292 as an input to MUX 224 for loading into register 204.

This structure allows the inactive register to act as a shift register chain wherein each register shifts its value to the next register in the chain. Appropriate selection of the MUX's 224, 226, 228, and 210 allows the inactive registers to act as a shift register shifting each of the inactive register values, in sequence, to the PAD 212 via output path 248. PAD 212 provides a direct interface for the inactive register chain to a buffer memory associated with the target device controller. In this manner, a complete inactive command context may be rapidly shifted out of the inactive context 200 to buffer memory locations to thereby save an inactive command context. In like manner, a complete inactive command context may be shifted from buffer memory into the inactive context 200. The active command context may likewise be saved by swapping the active context 202 into the inactive context 200, then shifting the inactive context 200 out to buffer memory.

Additional inactive command contexts may therefore be stored in the buffer memory of the target device controller. One inactive context 200 may be rapidly swapped with the active context 202. Other inactive contexts may be stored in the buffer memory of the controller and then shifted into the inactive context 200 registers when required for swapping into the active context 202.

The register structure depicted in FIG. 2 is exemplary of a structure which stores an active and inactive command context in a memory device (register sets) which permits rapid, automated, swapping (toggling) of the active and inactive contexts while also permitting the inactive context to be loaded from, or stored to, a buffer memory. One of ordinary skill will recognize many equivalent structures suited to particular applications having particular context data structures associated therewith or particular functions associated with modifying the active context values. All such structures are intended as within the scope of the present invention.

Disk Context Dual Counter Operation

While a plurality of command contexts may be managed as described above, the disk channel may continue to operate to transfer information on behalf of an inactive command context. For example, while a host generated read request in the active context is awaiting receipt of required data for transfer to the host channel, an inactive command context may be activated (swapped with the active context) to utilize the idle host channel for other transfers. The disk channel will continue to operate on behalf of the previously active (now inactive) read command. The inactive context will therefore not be updated to reflect the continued disk read transfers to the controllers buffer memory.

There are two exemplary situations where the disk block transfers must be held for later register updates (anytime disk and host contexts don't match). First, transfers on behalf of a presently inactive command context, and second, where a disk read ahead request reads more blocks than are to be transferred for a host command. Such a read ahead request may be generated within the controller (by the CPU therein) in response to a host read command for a number of blocks and in anticipation of subsequent read commands received from an attached host requesting additional blocks in sequence. For example, though a host may request only a few blocks in an area of the disk, the controller may issue the read to the disk channel as a command to read all blocks on the same track. As subsequent read commands are received from the host, those additional blocks (in the buffer memory cache) may be rapidly returned.

In this manner, the disk channel may be requested to transfer blocks to or from the disk in a manner which is independent of the counters in the presently active command context. It is desirable to permit operation of the disk channel independent of the command context associated with the present host channel transfer (the active context). The present invention therefore utilizes a dual counter structure to efficiently manage this condition and permit the disk channel to continue operation regardless of the active context presently utilizing the host channel.

The disk and host channels are each presumed herein to generate two pulsed signals for each block of data transferred to or from the HDA disk medium or host, respectively. Since both the host and disk channel utilize well known error checking and/or correction codes in the data to detect and/or correct errors in the transferred data, a first pulse indicates that a block of data was transferred and a second pulsed signal indicates that the block was successfully transferred and is now "released" in the buffer memory of the controller. Released as used herein means available for the next intended purpose such as processing by the controller or host or freed and available in the buffer memory for re-use by another command context. The first signal is referred to herein as an end of sector signal (EOS) and the second is referred to as a block released (BR). These signals as used in association with the host channel transfer are referred to herein as the host end of sector (HEOS) and the host block released (HBR) signals. With respect to the disk channel, the signals are referred to herein as the disk end of sector (DEOS) and disk block released (DBR) signals.

The command context on behalf of which the disk channel is presently operating (if any) is referred to herein as the disk context. The command context on behalf of which the host channel is presently operating is, as above, referred to herein as the active context. When the disk context is not the same as the active context, counters are used to count the blocks transferred and released for the disk channel to determine when the requested operation is completed. An independent (hence dual) set of counters is used to determine when a particular host transfer is completed. Certain of these counters are associated with the context data structure discussed above and are therefore saved and restored with the context as it is activated and deactivated. The dual counter feature of the present invention therefore maintains information regarding a count of blocks transferred by the disk channel which do not correspond to the presently active context. When the appropriate context is again activated (or created and activated in the case of a read ahead disk operation), then the stored block count is automatically applied to the counters of the command context to account for the pulsed signals missed in the active context.

The extra DBR pulses for a controller initiated read ahead (extra blocks beyond the host request which therefore do not correspond to a particular context) are counted in a counter referred to as the disk data block released counter (DDBRC). The extra DBR pulses are also stored in counters associated with the host channel, namely the host buffer space counter (HBSC) if the disk context is still the active context or the host data block released counter (HDBRC) if the disk context is not presently the active context. The extra counts in the DDBRC indicate to the controller the status of the read ahead operation or to update the command context corresponding to the disk channel operation when it is again active.

If the next command context is a sequential read of the extra blocks read by the read ahead operation, the extra counts in the DDBRC and HDBRC may be used to rapidly, automatically adjust the other counters to account for the stored block pulse signals. If the extra block pulses were for a read ahead operation and the next host command does not require the use of the read ahead blocks, the CPU of the controller may clear the extra pulse counts in the counter registers. If the extra pulse signals correspond to a command context that was temporarily inactive, the stored pulse counts are used to rapidly update that command context when the context is again activated.

FIG. 4 is a block diagram of an exemplary preferred embodiment of a circuit which maintains a count of disk transfers occurring through the disk channel on behalf of either a disk read ahead or on behalf of an inactive command context. The circuit of FIG. 4 represents a preferred implementation of the transfer control 109 elements of FIG. 1. As noted in FIG. 1, the counter values may be integrated in part with the DMA 106 and in part with the disk formatter 104.

A disk end of sector (DEOS) signal applied to path 478 is pulsed by the disk channel for each block (sector) which is transferred from the storage medium to the buffer memory of the controller. A disk block released (DBR) signal applied to path 458 is pulsed by the disk channel for each block (sector) which is correctly transferred from the storage medium to the buffer memory of the controller. In like manner, a host end of sector (HEOS) signal and host block released (HBR) applied to paths 482 and 480, respectively, when a block is transferred to the host channel and successfully transferred to the host channel, respectively.

A context comparison element 400 generates a TRUE signal applied to path 450 (also labeled "A") if the currently active context corresponds to the context which initiated the presently operating disk transfer (also referred to herein as the disk context). One of ordinary skill in the art will readily recognize that a context ID may be associated with each command context as one of the parameters stored in the context structure and registers. A register associated with the disk channel may therefore retain the context ID of the command context which initiated the disk transfer. A simple comparator device may then determine if the presently active context ID matches the retained context ID within the disk channel.

Two counter elements are used under certain conditions to count the number of DBR signal pulses: the HDBRC counter 404 and the DDBRC counter 410. The HDBRC counter 404 value is incremented once for each REL_HDBR pulsed signal applied to its input path 458 (each DBR signal pulse) and decremented once for each pulsed signal applied to it input path 454. The DDBRC counter 410 is incremented once for each DBR pulsed signal applied to it input path 462 and decremented once for each REL_DDBR pulsed signal applied to its input path 464. The present value of HDBRC counter 404 is applied to element 408 via path 456 to determine if the value is not equal to zero. If the value on path 456 is not zero, element 408 applies a TRUE signal to path 452, otherwise a FALSE signal is applied thereto.

Two additional counters are used to control the counter circuits. Disk transfer counter (DXFERC) counter 418 is decremented once for each DBR pulsed signal applied to its input path 474. The present value of DXFERC counter 418 is applied to element 424 via path 470 to determine if the value is not equal to zero. If the value on path 470 is not zero, element 424 applies a TRUE signal to path 472, otherwise a FALSE signal is applied thereto. The host buffer space (HBSC) counter 406 is incremented once for each DBR pulsed signal applied to its input path 454. The HBSC 406 is representative of a register in the active context which indicates the number of sectors in the buffer segment. The HBSC counter 406 is decremented by the host end of sector (HEOS) signal pulses applied to path 482 or is reset by the CPU of the controller when the context is reprogrammed for a new host command.

When processing a read ahead disk operation from the disk channel processor, the DXFERC counter 418 is loaded with the number of blocks to be transferred from the disk medium. The DXFERC counter 418 cannot be decremented further in response to DBR pulses on path 458 after it reaches zero. Rather, the additional DBR signal pulses are stored in the DDBRC counter 410 until the DXFERC counter 418 is again loaded with a non-zero value. At this time the stored DBR pulses in the DDBRC counter 410 are "released" to further decrement the DXFERC counter 418. The pulse count stored in the DDBRC counter 410 is decremented, "releasing" a DBR pulse to again decrement the DXFERC counter 418 until either the DDBRC counter 410 or the DXFERC counter 418 again reaches zero.

AND gate 416 receives the DDBR_NZ and DXFER_NZ signals on paths 468 and 472, respectively, to indicate whether the DDBRC counter 410 and the DXFERC counter 418, respectively, are presently zero. If both counters (410 and 418) are non-zero, AND gate 417 applies a TRUE value to path 464 indicating that a DBR signal pulse should now be released to decrement the DXFERC counter 418. AND gate 412 receives the DBR pulse on path 458 and the negated DXFER_NZ signal on path 472 and applies the logical and of the two signal as a pulse on path 462. The pulsed signal then increments the DDBRC counter 410 for each DBR signal pulse when the DXFER_NZ signal is FALSE (when DXFERC is equal to zero). AND gate 422 receives the DBR pulsed signal on path 458 and the DXFER_NZ signal on path 472 and applies the logical and of the two signals as a pulse on path 474. This pulsed signal and the REL_DDBR signal on path 464 are received as inputs at OR gate 420 which applies the logical or of the two signals as a pulse on path 476 to decrement the DXFERC counter 418.

The disk read ahead counter structure therefore operates in accordance with the following logic equations:
DDBR_NZ := not (DDBRC=0)
DXFER_NZ := not (DXFERC=0)
REL_DDBR := DDBR_NZ and DXFER_NZ
increment DDBRC := DBR and (not DXFER_NZ)
decrement DDBRC := REL_DDBR
decrement DXFERC := REL_DDBR or (DBR and DXFER_NZ)

When processing a disk transfer function on behalf of an inactive command context (i.e., when the disk context ID is not the active context ID), the host buffer space (HBSC) counter 406 cannot be incremented in response to DBR signals until the disk context is again equal to the active context. Rather, the HDBRC counter 404 saves the DBR pulse signals in a count until the saved count can be released to the HBSC counter 406 when the disk context is again activated. When the disk context is again the active context, the saved count in the HDBRC counter 404 is rapidly transferred to the HBSC counter 406 as incrementing pulses.

In particular, AND gate 402 receives the HDBR_NZ signal on path 452 indicative of the DBRC counter 404 being non-zero (saved DBR pulses in the counter) and the disk context active signal on path 450 (also referred to herein as DCA). The logical and of the two signals is then applied to path 454 as a pulsed signal to increment the HBSC counter 406.

The inactive disk context counter structure is therefore operable in accordance with the following logic equations:
DCA := (disk context=active context)
HDBR_NZ := not (HDBRC=0)
increment HBSC := REL_HDBR := DCA and HDBR_NZ
decrement HBSC := HEOS
increment HDBRC := DBR
decrement HDBRC := REL_HDBR This dual counter structure of the present invention enables efficient multiple context operation and allows simultaneous disk read ahead operation. The disk channel (on behalf of the disk context) can be reading ahead for one transfer operation while the host channel is occupied with a completely different operation. However, when the disk context and active context are again one and the same, the transfer counters can be rapidly, automatically updated to adjust for activity occurring while the active context was inactive. This rapid update occurs without requiring CPU intervention in the controller operation.

The dual counter structure has been described above with respect to read operations on the disk channel. One of ordinary skill will readily recognize that the structure is similarly functional to operate the disk channel to write data to the disk medium in parallel with other command contexts operating the host channel. The disk channel continues to transfer data blocks from the buffer memory to the disk medium though the counter structure though the host channel is operating on a different active context. When the active context is again toggled back to the write command context corresponding to the disk channel operation (the disk context), the host channel counter registers in the active context can be rapidly and automatically updated to reflect the disk channel activity.

Another feature of the dual counter structure depicted in FIG. 4 and described above is the use of a threshold value to determine when the disk channel requires host channel activity to maintain full utilization of the disk channel bandwidth. For example, a read operation in the active context will initiate a corresponding read operation on the read channel. The active command context will typically be swapped (toggled) to another command to utilize the host channel while the disk channel begins reading requested blocks. When the disk channel (operating on the disk context) sufficiently fills the buffer memory on behalf of the now inactive command context, the inactive command context must be re-activated to transfer the filled blocks to the host channel and thereby permit the blocks to be re-used for additional data blocks. If the inactive context is not swapped back to the active context, then the disk channel will be forced to stop data transfers until sufficient buffer space is released by the host.

The dual counter structure of the present invention therefore includes a threshold comparison value for the disk channel operation. Referring again to FIG. 4, a disk buffer space (DBSC) counter 426 is incremented once for each DEOS signal pulse applied to path 478. The DBSC counter 426 is decremented once for each pulse signal applied to path 484. The HBR signal pulse on path 480 (indicative of a successful transfer of a block to the host channel) is applied as an input to AND gate 430. The disk context active (DCA) signal on path 450 (also labeled "A") is applied as the other input to AND gate 430. The logical and of the two signals (indicative of a successful host channel block transfer when the active context is the disk context) then generates output pulse signals applied to path 484.

The present output value of the DBSC counter 426 is applied as an input signal to threshold comparator 428 via path 486. The threshold comparator 428 compares its input value (the value of the DBSC counter 426) to a predetermined, programmable threshold value. If the DBSC counter 426 value is greater than or equal to the threshold comparator 428 predetermined value, the comparator applies a logical TRUE signal to its output to thereby request the context management logic (107 of FIG. 1) to swap the disk context into the active context.

The predetermined threshold value is chosen so as to permit the context management logic sufficient time to swap contexts before the disk channel is forced to stop for lack of available buffer space. Specifically, the threshold must be a value such that the DMA transfer in process on behalf of the presently active context (if any) can complete its present block transfer. The specific operation of the context management logic is presented below in the form of a state machine. The use of the DBSC counter 426 to request a toggle to the disk context is operable in accordance with the following logic equations:

increment DBSC :=DEOS
decrement DBSC :=HBR and DCA
DTOG (request disk context toggle):=DBSC>=THRESH Context Management State Machine Model The present invention also includes a state machine model for automated management of the multiple command contexts. This feature of the present invention further enables efficient management of the multiple contexts within the target device while minimizing intervention required by the CPU. The state machine model of the present invention automatically controls the loading and storing of inactive contexts in the buffer memory from the inactive context register set (as discussed above with respect to FIG. 2). In addition, the state machine model of the present invention automates the swapping of the active and inactive contexts as required to improve performance of the storage target device.

Any transfer request must be programmed into a context by the CPU 102 or the host channel interface 108 of the controller 101 of FIG. 1. There are preferably two contexts maintained in register sets within the context management logic 107 of the controller, namely the active context and (at least one) inactive context. The inactive context may be completely programmed by the CPU while the active context is busy transferring data as requested.

The DMA 106 of FIG. 1 will transfer the requested data until it completes the transfer and then enter a paused state (setting appropriate status and interrupt conditions as required). The DMA 106 may also be placed in a paused state by external control such as by CPU 102 or by host channel interface 108 or by the context management 107 within the DMA in order to change the context prior to completion of the active context. In addition, the DMA will pause when the HBSC counter (discussed above with respect to FIG. 4) counts down to zero indicating no further data is available (in the case of a read operation) or indicating the buffer is full (in the case of a write operation).

While the DMA 107 is paused, for any reason, the active and inactive context may be swapped (toggled) such that the DMA will then resume operation in a different command context.

To perform a read or write operation the CPU 102 of controller 101 programs an inactive context into the inactive context register set. As noted above, the inactive context may be loaded by the CPU while the DMA operates on the active context. When the programmed inactive context is swapped with the active context, the DMA will then begin operation on the new read or write command. When the newly programmed command context competes, the DXFERC counter (of FIG. 4) will be zero to thereby force any subsequent DBR pulse signals to accumulate in the DDBRC counter. If the next command may be coalesced with the just completed command, the accumulated DBR pulses in the DDBRC counter will be released when the DXFER counter is programmed to the expected length of the next command. The next command may be coalesced if it follows sequentially from the previous command as indicated by the address and size of the two commands.

In order to perform required context swaps automatically and quickly, the present invention provides for an auto-write context stored in the inactive context or in the buffer memory such that it can be quickly located and loaded into the inactive context (for swapping into the active context). The auto-write context enables rapid initiation of a write command without requiring a host channel disconnect/ reconnect sequence (such as in the SCSI protocols). If the command is stored in another context, such as the inactive, secondary, or disk contexts, then the host channel will be temporarily disconnected to permit the context to be programmed and stored. The auto-write context is preprogrammed by the microprocessor with several parameters common to any write operation. Other values (such as the transfer length, or the LSC) are programmed directly by the host channel interface.

The host channel interface determines if a received write command is optimally processed in the auto-write context. If so, the host channel interface remains connected to the host channel, parses the command and loads appropriate values into the auto-write context already loaded into the active context by the DMA context management logic. This operation requires no CPU intervention thereby minimizing the time between receiving the write command and actually transferring the requested data.

If the auto-write context is not ready for use by the host channel interface or if the write command can be coalesced with another (earlier) write command, then the auto-write context is not used. Rather, the command will be either coalesced with another context or will be processed by the CPU to create another context for processing in the DMA. The CPU will program the command into either the inactive context, the secondary context, or the disk context, depending upon the priority of the command relative to other contexts.

Another context, the secondary context, is programmed in buffer memory to prepare a second inactive context for later loading into the inactive context and eventual swapping with the active context. A read or write command which cannot use the auto-write context (and cannot be coalesced with another context), can be programmed by the CPU into the secondary context, the inactive context or the disk context. The inactive or secondary context is used when the related data can be stored in the buffer memory while the disk channel is occupied with other transfers. The CPU can program the new command directly into the disk context if the disk context is not presently in use corresponding to present disk channel activity. In the preferred embodiment, the new command would typically be programmed into the secondary context and moved to the disk context when the disk channel is available for additional transfer requests.

The secondary context is loaded into the inactive context and swapped to the active context when the host channel is idle (i.e., when the active and inactive contexts are not using the host channel). A read command in the secondary context, when activated, will return requested data from the buffer memory (read cache hits). A write command in the secondary context, when activated, will store received write data in the buffer memory. Later operations will be initiated to post the write data in the buffer memory to the disk channel for storage on the disk medium.

The state machine model of the present invention therefore controls the use of four contexts relating to host transfer requests, namely the active context, the inactive context, the auto-write context, and the secondary context. The disk context is the context which was the active context when the disk operation was initiated. As noted above, the active context may be swapped many times to service host channel transfers while the disk channel is operable on another context.

The state machine model of the context management logic automatically controls the swapping of the active and inactive contexts as well as the automated loading of the inactive context with a context (such as the auto-write context or secondary context). The state machine model operates in accordance with a priority assigned to each context. The context management logic of the DMA element (of FIG. 1) will automatically load a new context (and swap it into the active context) if it is a higher priority than the current active context. The highest priority is the auto-write context because the host channel interface has already determined that the write request must be satisfied immediately. Since the host channel interface remains connected to the host channel during this time, the DMA starts automatically on the new auto-write context as soon as possible.

The next priority is the context which corresponds to the disk context. As noted above, when the DBSC counter reaches a pre-defined threshold value, the host context which corresponds to the disk context must be rapidly activated to avoid stopping the operation of the disk channel. If the disk context is already loaded into the inactive context, then the context management state machine will toggle (swap) the active and inactive contexts as soon as possible. If an auto-write context request is pending at the same time that the disk context requires reactivation, the auto-write context will be activated for the duration of one block, then swap back to the disk context as the active context.

If the active context is not presently ready to transfer data and the disk context does not presently require activation (i.e., the DBSC counter has not reached the pre-defined threshold value), then the state machine looks to the inactive context as the next priority. If the inactive context contains a valid, programmed context at the moment, then the active and inactive contexts are swapped (toggled) and the newly activated context will be resumed by the DMA.

If the active context is idle, the disk context does not require activation, and the inactive context is idle (not programmed with a command context), then the secondary context is the last priority. The secondary context is a context programmed in the buffer memory (i.e., by the CPU in response to a newly received host request), that is loaded into the inactive context, and swapped with the active context to commence operation thereon.

If there is no secondary context programmed in the buffer memory, then the disk context is swapped into the active context as a default condition to maintain the disk channel counter registers as up to date as possible.

Status bits associated with a context are used to determine if a context can be stored to buffer memory. If a context has outstanding status information, then the context will not be stored to buffer memory until the status information is detected, and cleared, by the CPU or host channel interface. This features allows the CPU to determine status without requiring access to the buffer memory.

The following table summarizes the priority of the various contexts for possible loading and swapping into the active context.

| Priority | Description |
| --- | --- |
| 1. Auto-write context | If the host channel has replied to a host write command such that data will be received therefrom imminently. |
| 2. Disk context | DBSC register has reached a threshold that requires the host channel to release or provide additional buffer space to maintain disk channel activity. |

-continued

| Priority | Description |
| --- | --- |
| 3. Inactive context | The active context is idle and some command context is in the inactive context register set. |
| 4. Secondary context | The active and inactive register sets are both idle. |

The complete state machine model of the present invention incorporates operations required to load a context from the buffer memory into the inactive context and the subsequent operation to swap the loaded inactive context with the active context.

Specifically, the state machine model operates in accordance with the state diagram of FIG. 5. The state machine as depicted in FIG. 5 may be logically broken into two halves joined by the "idle" state 500. Transition 550 begins the processing of the state machine by entering the idle state 500 from the reset of the state machine.

The states and transitions toward the left half of FIG. 5, namely states 502–508 and transitions 552–566, controls the swapping of active and inactive contexts. The states and transitions toward the right half of FIG. 5, namely states 514–524 and transitions 572–590, control the automatic loading and storing of contexts in the buffer memory. 15 The state machine makes a transition from one state to another in response to particular logic states of a number of signals. Each transition between states is labeled with boolean conditions involving these variable (if any) which cause the state transition and also labeled with side effects affecting the values of these variable (if any) caused by the state transition. 20 The six transitions from the idle state 500 are mutually exclusive with respect to the conditions which trigger them. A priority value (1–7) is assigned to each transition from the idle state to resolve and conflicts in the transition is to be invoked at a given time. The priorities associated with the transitions 552–558 and 572–578 from the idle state 500 are preferably defined as follows for maximal improvement in the target sevice performance:

| Transition | Priority |
| --- | --- |
| 556 | 1 |
| 552 | 2, 7 |
| 558 | 3 |
| 572 | 5 |
| 574 | 4 |
| 578 | 6 |

The priority assigned to transition 552 indicates that it is tested second and again seventh (last) to assure rapid toggle of the active context to the disk context from an active host (write) context.

With reference to FIG. 5, if a toggle is required to activate another context, the left side of the state machine model is operable to make a transition from the SWAP_IDLE state 500 to the appropriate TOGGLE_x state for the type of toggle requested. Specifically, and in order of priority indicated on FIG. 5, transition is made to state TOGGLE_WRITE 504 if an auto-write context is ready for operation, to state TOGGLE_DISK 502 if the disk context requires host channel processing, or to state TOGGLE_SECOND 506 if no other context is ready for activation. The TOGGLE_x state then prepares for a toggle to the corresponding context and makes a transition to the AUTO_TOGGLE state 508 to actually perform the required toggle between the inactive and active contexts. Finally, the AUTO_TOGGLE state 508 make a transition back to the SWAP_IDLE state 500 when the swap has completed.

The toggle side of the state machine operates using the following state variables:

EN_TOG—1 enables toggle state machine operation 0 disables.

WTOG—1 indicates a request to toggle to the auto-write context as active context.

DTOG—1 indicates a request to toggle to the disk context as active context.

ITOG—1 indicates a request to toggle to the inactive context

STOG—1 indicates a request to toggle to the secondary context

WPRIV—1 indicates the auto-write context must be held in the active context.

DPRIV—1 indicates the disk context has priority

DEFAULT_TO_DISK—1 indicates that the disk context is to be checked again last as the default priority when no other context requires activation.

AUTO_PAUSE—1 indicates a request to pause the DMA transfer from the disk channel to memory at the next sector boundary.

AUTO PAUSED—1 indicates that the DMA has reached the next sector boundary and has paused.

The toggle (auto-swap or left side) portion of the state machine then operates in accordance with the following state transition table.

| State (label) | Condition (label) | Next State (label) | Side Effect |
| --- | --- | --- | --- |
| SWAP_IDLE (500) | EN_TOG=1 and (DTOG=1 or DEFAULT_TO_DISK=1) (552) | TOGGLE_DISK (502) | AUTO_PAUSE := 1 |
| SWAP_IDLE (500) | EN_TOG=1 and WTOG=1 (556) | TOGGLE_WRITE (504) | AUTO_PAUSE := 1 |
| SWAP_IDLE (500) | EN_TOG=1 and (STOG=1 or ITOG=1) and DTOG=0 and DPRIV=0 and WPRIV=0 (558) | TOGGLE_SECOND (506) | AUTO_PAUSE := 1 |
| TOGGLE_DISK (502) | AUTO_PAUSED=1 (560) | AUTO_TOGGLE (508) | AUTO_PAUSE := 0 |
| TOGGLE_WRITE (504) | AUTO_PAUSED=1 (562) | AUTO_TOGGLE (508) | AUTO_PAUSE := 0 |

-continued

| State (label) | Condition (label) | Next State (label) | Side Effect |
| --- | --- | --- | --- |
| TOGGLE_SECOND (506) | AUTO_PAUSED=1 (564) | AUTO_TOGGLE (508) | AUTO_PAUSE := 0 |
| AUTO_TOGGLE (508) | true (566) | SWAP_IDLE (500) | |

With reference to FIG. 5, if no toggle is required, then the lesser priority load/store operations are processed if required by the right side of the state machine model of FIG. 5. In particular, the state machine model is operable to make a transition from the SWAP_IDLE state 500 to the appropriate STORE_x state for the type of load/store operation requested. Specifically, and in order of priority indicated on FIG. 5, transition is made to the STORE_WRITE state 516 if an auto-write context is ready for loading to the inactive context, to the STORE_DISK 514 if the disk context is to be loaded into the inactive context, or to the STORE_SECOND 518 if the secondary context is to be loaded into the inactive context. The WAIT_STORE state 520 then stores the present inactive context into buffer memory to prepare for loading a new inactive context. The WAIT_STORE state 520 then transitions to the LOAD state 522 after the present inactive context is stored and the new context can be loaded. The WAIT_LOAD state 522 then awaits the completion of the loading of the new inactive context from buffer memory. Finally, the WAIT_LOAD state 522 make a transition back to the SWAP_IDLE state 500 when the store/load operation has completed.

The load/store side (or right side) of the state machine operates using some of the same state variable listed above and the following additional state variables:

EN AUTO—1 indicates enabled 0 indicates disabled for load/store operation.
SLOAD—1 indicates that a load of the secondary context into the inactive context is desired.
DLOAD—1 indicates that a load of the disk context into the inactive context is desired.
WLOAD—1 indicates that a load of the auto-write context into the inactive context is desired.
CNTXTVLD=1 indicates the context is presently valid.
CNTXTDID—the value of the context ID which is presently the disk context.
SCONTXT—the ID value of the secondary context.
WCONTXT—the ID value of the auto-write context.
AUTO_CTXSTORE—1 indicates a request to store the present inactive context in buffer memory for later re-loading.
AUTO_CTXLOAD—1 indicates a request to load the new context from buffer memory into the inactive context.
AUTO_CTXID—the ID value of the new context to be loaded.

The load/store (or right side) portion of the state machine then operates in accordance with the following state transition table.

| State (label) | Condition (label) | Next State (label) | Side Effect |
| --- | --- | --- | --- |
| SWAP_IDLE (500) | EN_AUTO=1 AND DLOAD=1 (572) | STORE_DISK (514) | AUTO_CTXSTORE := 1 |
| SWAP_IDLE (500) | EN_AUTO=1 AND WLOAD=1 (574) | STORE_WRITE (516) | AUTO_CTXSTORE := 1 |
| SWAP_IDLE (500) | EN_AUTO=1 AND SLOAD=1 AND GET_WCNTXT=0 AND DPRIV=0 (578) | STORE_SECOND (518) | AUTO_CTXSTORE := 1 |
| STORE_DISK (514) | CNTXTVLD=0 (580) | WAIT_STORE (520) | AUTO_CTXSTORE := 0, AUTO_CNTXTID := DCONTXT |
| STORE_WRITE (516) | CNTXTVLD=0 (582) | WAIT_STORE (520) | AUTO_CTXSTORE := 0, AUTO_CNTXTID := WCONTXT |
| STORE_SECOND (518) | CNTXTVLD=0 (584) | WAIT_STORE (520) | AUTO_CTXSTORE := 0, AUTO_CNTXTID := SCONTXT |
| WAIT_STORE (520) | CNTXTVLD=1 (586) | LOAD (522) | AUTO_CTXLOAD := 1 |
| LOAD (522) | CNTXTVLD=0 (588) | WAIT_LOAD (524) | AUTO_CTXLOAD := 0 |
| WAIT_LOAD (524) | CNTXTVLD=1 (590) | SWAP_IDLE (500) | AUTO_CTXLOAD := 0 |

The state machine model described above may be implemented in any of several well known forms, including software in a general purpose computer, programmable logic devices, or custom discrete or integrated circuits. As described herein, the state machine model is preferably implemented in custom integrated circuits integrated as shown in FIG. 1 with other components in the controller 101 of a target device 100. One of ordinary skill in the art will readily recognize that other state variables and intermediate states may be required to implement a state machine in a particular integrated circuit medium with particular timing and speed constraints. Design tools well known to those skilled in the art typically aid the designer in the creation and insertion of such timing related states and transitions.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a storage target device controller having a disk channel and a host channel, a system for prioritizing and automatically switching between a plurality of contexts to execute write commands from the host channel, to avoid stopping operation of the disk channel when no write command is received from the host channel and the disk channel requires data blocks from the host channel, and to optimize operation when commands remain to be performed and no write command is received from the host channel and the disk channel does not require data blocks from the host channel of the target device to remain operating, wherein each context contains all information required for the controller to process a command for data transfer across the peripheral bus, said system configured to provide that said controller manages multiple commands simultaneously and comprising:

memory for storing an inactive context corresponding to initiator device generated commands, said inactive context containing all information required for the controller to process a command for data transfer across the peripheral bus;

memory for storing an active context while said inactive context is being stored in said controller, said active context corresponding to present operation of said host channel and containing all information required for the controller to process a command for data transfer across the peripheral bus;

secondary memory for storing at least one additional inactive context;

a detector that detects whether said inactive context requires processing by said host channel;

a chain of registers for swapping said active context with said inactive context to Response to Office Action optimize the data transfer bandwidth of the peripheral bus and begin processing of said inactive context as the newly active context;

said controller configured such that said at least one inactive contexts stored in said secondary memory can be loaded into said memory for storing said inactive context; and a circuit which is configured to maintain a count of disk transfers occurring through the disk channel on behalf of one of a disk read ahead and an inactive command context, said controller configured to regard and prioritize each context as one of an auto-write context, a disk context and a secondary context, wherein said controller is configured to load said auto-write context into said memory for storing said active context in response to a write command from the host channel for immediate receipt of write data from the host channel, wherein said controller is configured to load said disk context into said memory for storing said active context when the disk channel requires additional data blocks from the host channel to avoid stopping processing of the disk channel and no write command is received from the host channel, and wherein said controller is configured to load said secondary context into said memory for storing said active context when the disk channel does not require additional data blocks from the host channel to avoid stopping processing of the disk channel and no write command is received from the host channel.

2. The system of claim 1 wherein a priority value is associated with said active context and with said inactive context and wherein said detector includes:

means for determining that the priority value associated with said active context is lower than the priority value associated with said inactive context.

3. The system of claim 2 wherein said priority value is determined in accordance with a type of the associated context and wherein said type is selected from the group consisting of: auto-write context, disk context, and secondary context, and wherein said auto-write context has a higher priority value than said disk context which, in turn, has a higher priority value than said secondary context.

4. The system of claim 1 further comprising:

a buffer memory;

means for storing at least one additional inactive context in said buffer memory; and means for loading said inactive context from one of said at least one additional inactive context.

5. The system of claim 4 wherein a priority value is associated with said active context and with said selected one of said at least one additional inactive context and wherein said means for loading includes:

means for determining that the priority value associated with said active context is lower than the priority value associated with said selected one of said at least one inactive context; and means responsive to the determination that said active context has a lower priority value than said selected one of said at least one additional inactive context for loading said inactive context with said selected one of said at least one additional inactive context.

6. The system of claim 5 wherein said priority value is determined in accordance with a type of the associated context and wherein said type is selected from the group consisting of: auto-write context, disk context, and secondary context, and wherein said auto-write context has a higher priority value than said disk context which, in turn, has a higher priority value than said secondary context.

7. In a storage target device controller having a disk channel and a host channel, a system for automatically prioritizing and switching between a plurality of contexts to execute write commands from the host channel, to avoid stopping operation of the disk channel when no write command is received from the host channel and the disk channel requires data blocks from the host channel, and to optimize operation when commands remain to be performed and no write command is received from the host channel and the disk channel does not require data blocks from the host channel of the target device to remain operating, wherein each context contains all information required for the controller to process a command for data transfer across the peripheral bus, said system configured to provide that said controller manages multiple commands simultaneously and comprising:

means for storing an inactive context corresponding to initiator device generated commands, said inactive context containing all information required for the controller to process a command for data transfer across the peripheral bus;

means for storing an active context while said inactive context is being stored in said controller, said active context corresponding to present operation of said host channel and containing all information required for the controller to process a command for data transfer across the peripheral bus;

a buffer memory;

means for storing at least one additional inactive context in said buffer memory;

a chain of registers for swapping said active context with said another context selected from the group consisting of said inactive context and said at least one additional inactive context to optimize the data transfer bandwidth of the peripheral bus and begin processing of said inactive context as the newly active context; and means for maintaining a count of disk transfers occurring through the disk channel on behalf of one of a disk read ahead and an inactive command context, said controller configured to regard and prioritize each context as one of an auto-write context, a disk context and a secondary context, wherein said controller is configured to load said auto-write context into said memory for storing said active context in response to a write command from the host channel for immediate receipt of write data from the host channel, wherein said controller is configured to load said disk context into said memory for storing said active context when the disk channel requires additional data blocks from the host channel to avoid stopping processing of the disk channel and no write command is received from the host channel, and wherein said controller is configured to load said secondary context into said memory for storing said active context when the disk channel does not require additional data blocks from the host channel to avoid stopping processing of the disk channel and no write command is received from the host channel.

8. The system of claim 7 wherein a priority value is associated with said active context, with said inactive context, and with each of said at least one additional inactive context, and wherein said means for switching includes:

first priority determination means for determining that the priority value associated with said active context is lower than the priority value associated with said inactive context; and swapping means, responsive to said first priority determination means, for swapping said active context and said inactive context when said active context priority value is less than said inactive context priority value.

9. The system of claim 8 wherein said priority value is determined in accordance with a type of the associated context and wherein said type is selected from the group consisting of: auto-write context, disk context, and secondary context, and wherein said auto-write context has a higher priority value than said disk context which, in turn, has a higher priority value than said secondary context.

10. The system of claim 8 wherein said switching means further includes:

second priority determination means for determining that the priority value associated with said active context is lower than the priority value associated with one of said at least one additional inactive context; and loading means, responsive to said second priority determination means, for loading said one of said at least one additional inactive context into said inactive context when said active context priority value is less than said priority value of said one of said at least one additional inactive context.

11. The system of claim 10 wherein said priority value is determined in accordance with a type of the associated context and wherein said type is selected from the group consisting of: auto-write context, disk context, and secondary context, and wherein said auto-write context has a higher priority value than said disk context which, in turn, has a higher priority value than said secondary context.

12. In a storage target device controller having a disk channel and a host channel, a method for prioritizing and automatically switching between a plurality of contexts to execute write commands from the host channel, to avoid stopping operation of the disk channel when no write command is received from the host channel and the disk channel requires data blocks from the host channel, and to optimize operation when commands remain to be performed and no write command is received from the host channel and the disk channel does not require data blocks from the host channel of the target device to remain operating, wherein each context contains all information required for the controller to process a command for data transfer across the peripheral bus, said system configured to provide that said controller manages multiple commands simultaneously and comprising the steps of:

storing a plurality of inactive contexts in memory, said inactive contexts corresponding to initiator device generated commands and containing all information required for the controller to process a command for data transfer across the peripheral bus;

storing an active context in said target device, said active context corresponding to present operation of said host channel and containing all information required for the controller to process a command for data transfer across the peripheral bus;

detecting that one of said inactive contexts should be said active context;

using a chain of registers to swap said active context with one of said inactive contexts and begin processing of one of said inactive contexts as the newly active context;

maintaining a count of disk transfers occurring through the disk channel on behalf of one of a disk read ahead and an inactive command context; and prioritizing each context as one of an auto-write context, a disk context and a secondary context, making said auto-write context said active context in response to a write command from the host channel for immediate receipt of write data from the host channel, making said disk context said active context when the disk channel requires additional data blocks from the host channel to avoid stopping processing of the disk channel and no write command is received from the host channel, and making said secondary context said active context when the disk channel does not require additional data blocks from the host channel to avoid stopping processing of the disk channel and no write command is received from the host channel.

13. The method of claim 12 wherein a priority value is associated with said active context and with said inactive context and wherein the step of detecting includes the step of:

determining that the priority value associated with said active context is lower than the priority value associated with said inactive context.

14. The method of claim 13 wherein said priority value is determined in accordance with a type of the associated context and wherein said type is selected from the group consisting of: auto-write context, disk context, and secondary context, and wherein said auto-write context has a higher priority value than said disk context which, in turn, has a higher priority value than said secondary context.

15. The method of claim 12 wherein the target device includes a buffer memory and the method further comprises the steps of:

storing at least one additional inactive context in said buffer memory; and loading said inactive context from one of said at least one additional inactive context.

16. The method of claim 11 wherein a priority value is associated with said active context and with said selected one of said at least one additional inactive context and wherein the step of loading includes the steps of:

determining that the priority value associated with said active context is lower than the priority value associated with said selected one of said at least one inactive context; and loading, responsive to the determination that said active context has a lower priority value than said selected one of said at least one additional inactive context, said inactive context with said selected one of said at least one additional inactive context.

17. The method of claim 16 wherein said priority value is determined in accordance with a type of the associated context and wherein said type is selected from the group consisting of: auto-write context, disk context, and secondary context, and wherein said auto-write context has a higher priority value than said disk context which, in turn, has a higher priority value than said secondary context.

18. In a storage target device controller having a buffer memory, a disk channel, and a host channel, a method for automatically prioritizing and switching between a plurality of contexts to execute write commands from the host channel, to avoid stopping operation of the disk channel when no write command is received from the host channel and the disk channel requires data blocks from the host channel, and to optimize operation when commands remain to be performed and no write command is received from the host channel and the disk channel does not require data blocks from the host channel of the target device to remain operating, wherein each context contains all information required for the controller to process a command for data transfer across the peripheral bus, said system configured to provide that said controller manages multiple commands simultaneously, said system comprising the steps of:

storing an inactive context in said target device, said inactive context corresponding to initiator device generated commands and containing all information required for the controller to process a command for data transfer across the peripheral bus;

storing an active context in said target device, said active context corresponding to present operation of said host channel and containing all information required for the controller to process a command for data transfer across the peripheral bus;

storing at least one additional inactive context in said buffer memory;

using a chain of registers to swap said active context with another context selected from the group consisting of said inactive context and said at least one additional inactive context with said inactive context to optimize the data transfer bandwidth of the peripheral bus and begin processing of said inactive context as the newly active context;

maintaining a count of disk transfers occurring through the disk channel on behalf of one of a disk read ahead and an inactive command context and prioritizing each context as one of an auto-write context, a disk context and a secondary context, making said auto-write context said active context in response to a write command from the host channel for immediate receipt of write data from the host channel, making said disk context said active context when the disk channel requires additional data blocks from the host channel to avoid stopping processing of the disk channel and no write command is received from the host channel, and making said secondary context said active context when the disk channel does not require additional data blocks from the host channel to avoid stopping processing of the disk channel and no write command is received from the host channel.

19. The method of claim 18 wherein a priority value is associated with said active context, with said inactive context, and with each of said at least one additional inactive context, and wherein the step of switching includes the steps of:

determining that the priority value associated with said active context is lower than the priority value associated with said inactive context; and swapping said active context and said inactive context when said active context priority value is determined to be less than said inactive context priority value.

20. The method of claim 19 wherein said priority value is determined in accordance with a type of the associated context and wherein said type is selected from the group consisting of: auto-write context, disk context, and secondary context, and wherein said auto-write context has a higher priority value than said disk context which, in turn, has a higher priority value than said secondary context.

21. The method of claim 19 wherein the step of switching further includes the steps of:

determining that the priority value associated with said active context is lower than the priority value associated with one of said at least one additional inactive context; and loading said one of said at least one additional inactive context into said inactive context when said active context priority value is determined to be less than said priority value of said one of said at least one additional inactive context.

22. The method of claim 21 wherein said priority value is determined in accordance with a type of the associated context and wherein said type is selected from the group consisting of: auto-write context, disk context, and secondary context, and wherein said auto-write context has a higher priority value than said disk context which, in turn, has a higher priority value than said secondary context.

* * * * *